US009577421B2

(12) United States Patent
Barker et al.

(10) Patent No.: US 9,577,421 B2
(45) Date of Patent: Feb. 21, 2017

(54) SYSTEM AND METHOD FOR ISOLATING GROUND FAULTS IN A WIND TURBINE

(71) Applicant: General Electric Company, Schenectady, NY (US)

(72) Inventors: Sidney Allen Barker, Troutville, VA (US); Cornelius Edward Holliday, Forest, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/742,737

(22) Filed: Jun. 18, 2015

(65) Prior Publication Data

US 2016/0372912 A1    Dec. 22, 2016

(51) Int. Cl.
*H02H 5/04* (2006.01)
*H02H 3/16* (2006.01)

(52) U.S. Cl.
CPC ...................................... *H02H 3/16* (2013.01)

(58) Field of Classification Search
CPC ............. H02J 3/386; F03D 7/042; F03D 7/00; H02K 7/183
See application file for complete search history.

(56) References Cited

U.S. PATENT DOCUMENTS

| | | | |
|---|---|---|---|
| 8,717,720 B2 | 5/2014 | DeBoer | |
| 2014/0112032 A1 | 4/2014 | Parkhou et al. | |
| 2015/0159625 A1* | 6/2015 | Hardwicke, Jr. | ..... F03D 7/0272 290/44 |
| 2016/0118786 A1* | 4/2016 | Zhu | ....................... F03D 7/0244 290/44 |

* cited by examiner

*Primary Examiner* — Karen Masih
(74) *Attorney, Agent, or Firm* — Dority & Manning, P.A.

(57) ABSTRACT

The present subject matter is directed to a system and method for operating a wind turbine connected to a power grid. The method includes receiving, via a controller, one or more current feedback signals from one or more electric current sensors of the wind turbine. Another step includes determining, via the controller, if a ground fault is occurring in the wind turbine based on the current feedback signals. In response to detecting a ground fault, the method includes tripping one or more electrical components of the wind turbine and electrically de-coupling the wind turbine from the power grid.

19 Claims, 6 Drawing Sheets

SYSTEM AND METHOD FOR ISOLATING GROUND FAULTS IN A WIND TURBINE

FIELD OF THE INVENTION

The present disclosure relates generally to wind turbines and, more particularly, to a system and method for isolating ground faults in a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

During operation, wind impacts the rotor blades and the blades transform wind energy into a mechanical rotational torque that rotatably drives a low-speed shaft. The low-speed shaft is configured to drive the gearbox that subsequently steps up the low rotational speed of the low-speed shaft to drive a high-speed shaft at an increased rotational speed. The high-speed shaft is generally rotatably coupled to a generator so as to rotatably drive a generator rotor. As such, a rotating magnetic field may be induced by the generator rotor and a voltage may be induced within a generator stator that is magnetically coupled to the generator rotor. The associated electrical power can be transmitted to a main transformer that is typically connected to a power grid via a grid breaker. Thus, the main transformer steps up the voltage amplitude of the electrical power such that the transformed electrical power may be further transmitted to the power grid.

In many wind turbines, the generator rotor may be electrically coupled to a bi-directional power converter that includes a regulated DC link. More specifically, some wind turbines, such as wind-driven doubly-fed induction generator (DFIG) systems or full power conversion systems, may include a power converter with an AC-DC-AC topology. Standard power converters typically include a bridge circuit, a power filter, and an optional crowbar circuit. The bridge circuit typically includes a plurality of cells, for example, one or more power switching elements and/or one or more diodes.

In some instances, ground faults can occur in a wind turbine when one or more phases of a conductor become shorted to ground during operation of the turbine. Such ground faults can be damaging to electrical components of the turbine and possibly hazardous to personnel who are present near the turbine. While it is prudent to cease operation of the wind turbine when a ground fault is detected, energy may continue to feed into the fault from the power grid. Since the grid breaker normally has a limited lifetime of operational cycles, the breaker is often operated in such a way that it remains closed even when the wind turbine is not producing power.

Using current feedback signals at various locations in the electrical system of the wind turbine, the wind turbine controller can sense that a ground fault is occurring. Thus, the wind turbine may be shut down and components within the turbine, such as the power converter, may be caused to trip. Such a trip may also open contactors internal to the turbine electrical system. In many cases, opening the internal contactors may prevent the source of electrical energy from the location of the ground fault. However, such operation may not always be the sufficient as the fault current may continually be fed from the power grid if the grid breaker remains closed. Such is especially likely if the amount of ground current is below the level that the grid breaker may use in its hardware to detect a ground fault.

Accordingly, an improved system and method for isolating ground faults in a wind turbine would be advantageous.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for operating a wind turbine connected to a power grid. The method includes receiving, via a controller, one or more current feedback signals from one or more electric current sensors of the wind turbine. Another step includes determining, via the controller, if a ground fault is occurring in the wind turbine based on the current feedback signals. In response to detecting a ground fault, the method includes tripping one or more electrical components of the wind turbine and electrically de-coupling the wind turbine from the power grid.

In one embodiment, electrically de-coupling the wind turbine from the power grid further includes opening a grid breaker electrically coupling the wind turbine to the power grid.

In another embodiment, the step of determining if a ground fault is occurring in the wind turbine based on the current feedback signals may further include summing the current feedback signals at a first location of the wind turbine, filtering the current feedback signals for the first location, and comparing the sum of the current feedback signals with a predetermined threshold. Thus, a sum above the predetermined threshold is indicative of a ground fault. More specifically, in certain embodiments, it should be understood that the above step of determining if a ground fault is occurring in the wind turbine may include summing the current feedback signals at a three-phase location, filtering the current feedback signals for the three phases, and comparing the sum of the current feedback signals with a predetermined threshold.

In specific embodiments, the predetermined threshold may include a percentage of a range of one or more of the electric current sensors. For example, in certain embodiments, the percentage may be from about 1% to about 25%, more preferably from about 5% to about 10%, still more preferably from about 8%.

In further embodiments, the method may also include demodulating the current feedback signals for the three phases. For example, after summing and filtering the three-phase currents, the currents may be demodulated into multiple components, e.g. x-y components or a d-q transformation. Thus, in such embodiments, the predetermined threshold may be reduced. More specifically, in such embodiments, the percentage of the range of one or more of the electric current sensors may be from about 1% to about 25%, more preferably from about 2% to about 7%.

In additional embodiments, the step of determining if a ground fault is occurring in the wind turbine based on the current feedback signals may also include summing the current feedback signals of node inputs at a node circuit location of the wind turbine, summing the current feedback signals of node outputs, and determining a difference between the sum of the node inputs and the sum of the node outputs. Thus, a difference above a predetermined threshold may be indicative of a ground fault. It should be understood that the above step of determining if a ground fault is occurring in the wind turbine may be applied on a per phase basis.

In yet another embodiment, the method may also include measuring, via the one or more electric current sensors, one or more current feedback signals at a plurality of locations in the wind turbine, and determining, via the controller, whether a ground fault is occurring in the wind turbine at each of the locations.

In additional embodiments, the current feedback signals may include any suitable signals, including but not limited to line current feedback signals, line-side converter feedback signals, rotor-side converter feedback signals, stator current feedback signals, transformer current, or similar. Thus, as mentioned, the method is configured to monitor for ground faults at multiple locations within the wind turbine.

In further embodiments, the step of tripping one or more electrical components of the wind turbine may include shutting down the wind turbine, opening one or more electrical contactors or switches of the wind turbine, or similar. For example, in certain embodiments, the electrical contactors or switches may include other breakers in the wind turbine as well as a synchronizing switch, a line converter switch, a distortion filter switch, or similar. Further, it should be understood that such switches may be any type of device that can be used to isolate part of the electrical system of the turbine.

In still additional embodiments, the method may also include implementing a follow-up action after tripping one or more electrical components or switches and opening the grid breaker. For example, in certain embodiments, the follow-up action may include re-starting the wind turbine after a predetermined time period that is sufficient to allow the ground fault to clear, if possible (i.e. if the fault can actually be cleared). Alternatively, if the fault cannot be cleared, the method may include sending an alarm signal to a user to indicate that the ground fault cannot be cleared without further action (i.e. by replacing the faulty hardware, etc.).

In another aspect, the present subject matter is directed to a method for operating a wind turbine connected to a power grid. The method includes monitoring, via one or more electric current sensors, current at one or more locations of the wind turbine. Another step includes determining, via the controller, a probability of a ground fault occurring in the wind turbine based on the monitored current. The method also includes opening a grid breaker electrically coupling the wind turbine to the power grid when the probability exceeds a predetermined threshold.

In yet another aspect, the present subject matter is directed to a system for operating a wind turbine connected to a power grid. The system includes one or more electric current sensors configured to generate one or more current feedback signals of the wind turbine, a grid breaker electrically coupling the wind turbine to the power grid, and a controller communicatively coupled to the one or more electric current sensors. The controller is configured to perform one or more operations, including but not limited to, receiving the current feedback signals from the one or more electric current sensors, determining if a ground fault is occurring in the wind turbine based on the current feedback signals, and in response to detecting a ground fault, tripping one or more electrical components of the wind turbine and opening the grid breaker between the wind turbine and the power grid.

In one embodiment, the electric current sensors may include one of or a combination of the following sensors: current transformers, shunt sensors, rogowski coils, hall effect current sensors, or similar. In addition, it should be understood that the system may be further configured with any of the additional features as described herein such that the system can implement any of the method steps as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for operating a wind turbine connected to a power grid. More specifically, the system is configured to detect and isolate ground faults occurring in a wind turbine so as to prevent damage to the electrical and control system of the wind turbine as well as potentially hazardous conditions for personnel. Ground faults occur in wind turbines when one or more phases of a conductor become shorted to ground while the turbine is energized and operating. As such, the system of the present disclosure is configured to receive one or more current feedback signals from one or electric current sensors of the wind turbine. Thus, the system can determine whether a ground fault is occurring in the wind turbine based on the current feedback signals. In response to detecting a ground fault, the system is configured to open one or more electrical components or switches of the wind turbine and electrically de-couple the wind turbine from the power grid, e.g. by opening a grid breaker electrically coupling the wind turbine to the power grid. For example, in certain embodiments, the electrical contactors or switches may include other breakers in the wind turbine as well as a synchronizing switch, a line converter switch, a distortion filter switch, or similar. Thus, by opening one or more of the electrical components and the grid breaker, the system can isolate the part of the electrical system experiencing the ground fault. As such, external energy may no longer feed the ground fault, thereby protecting the turbine from further damage.

Figure 1:
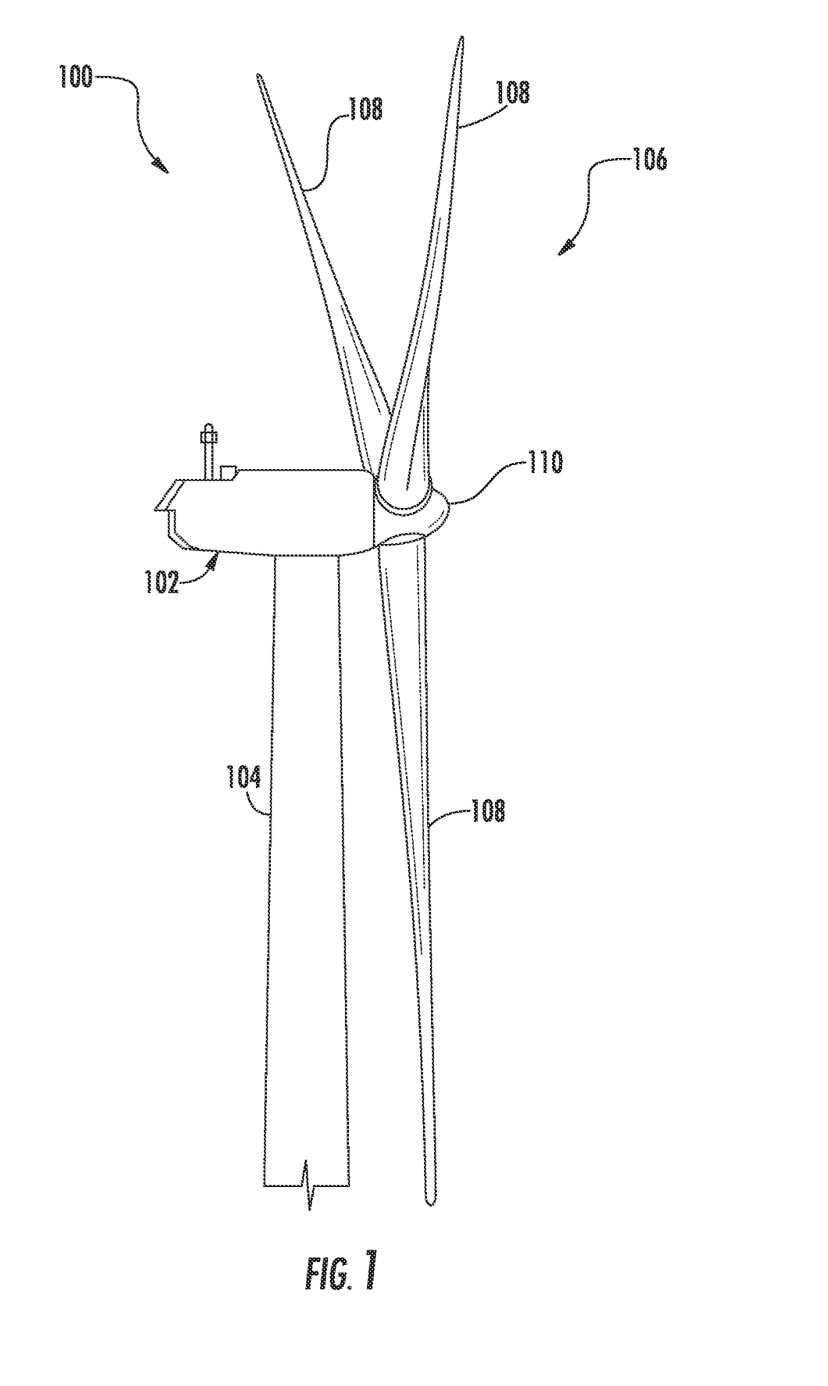
FIG. 1 illustrates a perspective view of a portion of one embodiment of a wind turbine according to the present disclosure.

Referring now to the drawings, FIG. 1 is a perspective view of a portion of an exemplary wind turbine 100 according to the present disclosure that is configured to implement the method and apparatus as described herein. The wind turbine 100 includes a nacelle 102 that typically houses a generator (not shown). The nacelle 102 is mounted on a tower 104 having any suitable height that facilitates operation of wind turbine 100 as described herein. The wind turbine 100 also includes a rotor 106 that includes three blades 108 attached to a rotating hub 110. Alternatively, the wind turbine 100 may include any number of blades 108 that facilitates operation of the wind turbine 100 as described herein.

Figure 2:
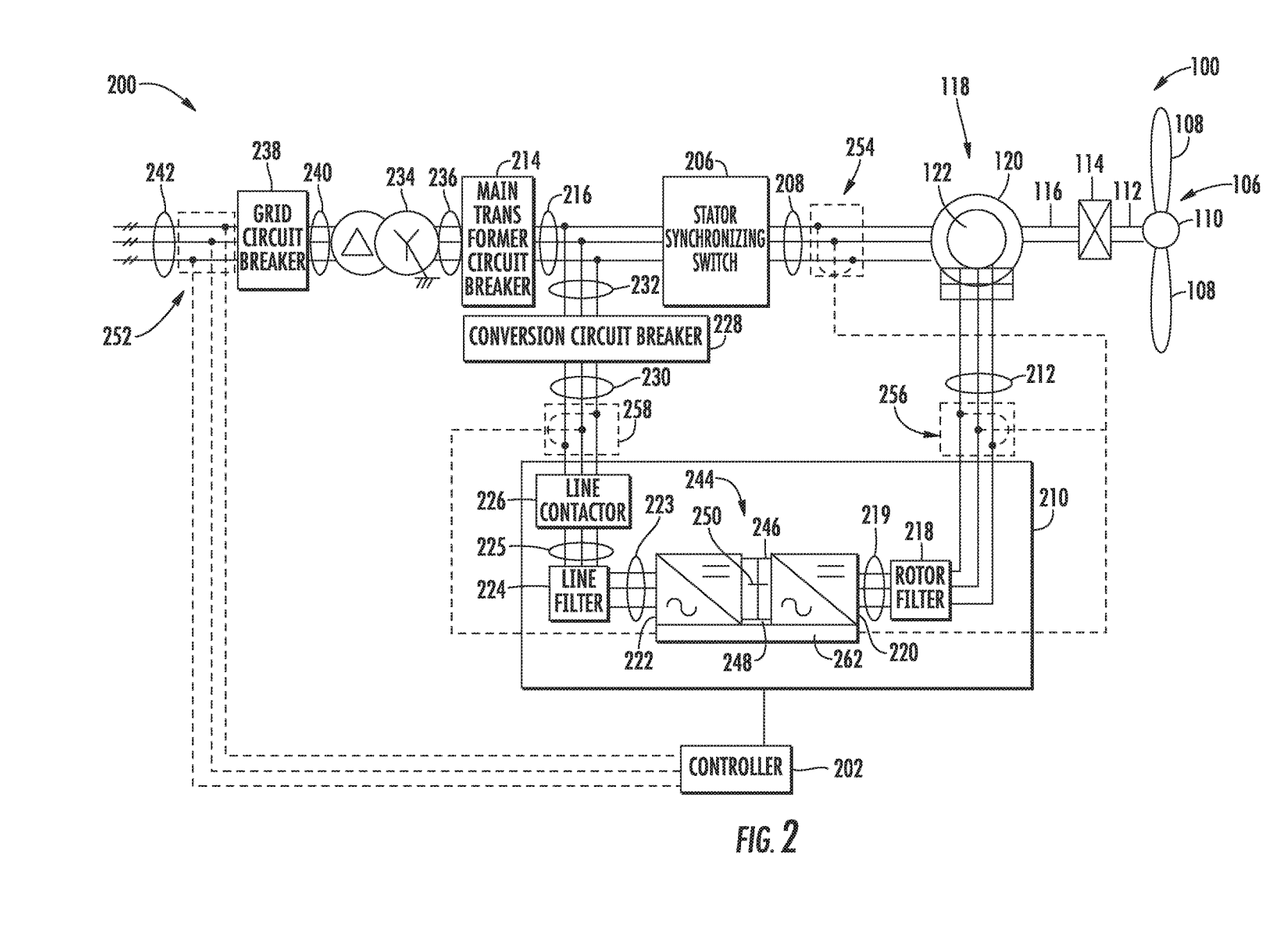
FIG. 2 illustrates a schematic view of one embodiment of an electrical and control system suitable for use with the wind turbine shown in FIG. 1.

Referring to FIG. 2, a schematic view of an exemplary electrical and control system 200 that may be used with the wind turbine 100 is illustrated. During operation, wind impacts the blades 108 and the blades 108 transform wind energy into a mechanical rotational torque that rotatably drives a low-speed shaft 112 via the hub 110. The low-speed shaft 112 is configured to drive a gearbox 114 that subsequently steps up the low rotational speed of the low-speed shaft 112 to drive a high-speed shaft 116 at an increased rotational speed. The high-speed shaft 116 is generally rotatably coupled to a generator 118 so as to rotatably drive a generator rotor 122. In one embodiment, the generator 118 may be a wound rotor, three-phase, double-fed induction (asynchronous) generator (DFIG) that includes a generator stator 120 magnetically coupled to a generator rotor 122. As such, a rotating magnetic field may be induced by the generator rotor 122 and a voltage may be induced within a generator stator 120 that is magnetically coupled to the generator rotor 122. In one embodiment, the generator 118 is configured to convert the rotational mechanical energy to a sinusoidal, three-phase alternating current (AC) electrical energy signal in the generator stator 120. The associated electrical power can be transmitted to a main transformer 234 via a stator bus 208, a stator synchronizing switch 206, a system bus 216, a main transformer circuit breaker 214, and a generator-side bus 236. The main transformer 234 steps up the voltage amplitude of the electrical power such that the transformed electrical power may be further transmitted to a grid via a breaker-side bus 240, a grid circuit breaker 238, and a grid bus 242.

Figure 3:
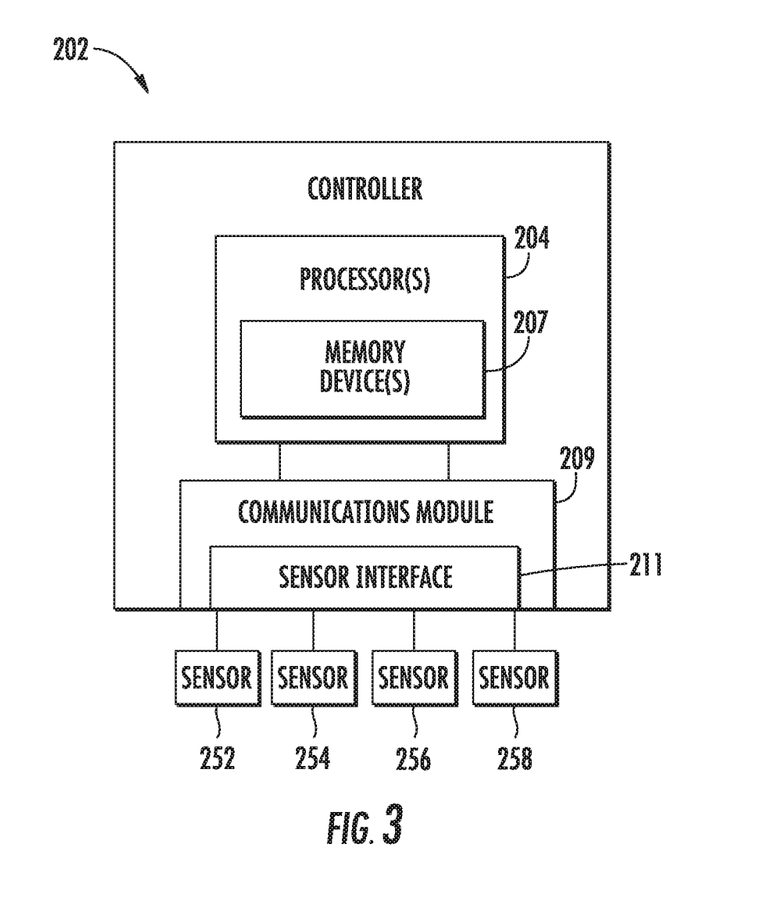
FIG. 3 illustrates a block diagram of one embodiment of a controller suitable for use with the wind turbine shown in FIG. 1.

In addition, the electrical and control system 200 may include a wind turbine controller 202 configured to control any of the components of the wind turbine 100. For example, as shown particularly in FIG. 3, the controller 202 may include one or more processor(s) 204 and associated memory device(s) 207 configured to perform a variety of computer-implemented functions (e.g., performing the methods, steps, calculations and the like and storing relevant data as disclosed herein). Additionally, the controller 202 may also include a communications module 209 to facilitate communications between the controller 202 and the various components of the wind turbine 100, e.g. any of the components of FIG. 2. Further, the communications module 209 may include a sensor interface 211 (e.g., one or more analog-to-digital converters) to permit signals transmitted from one or more sensors to be converted into signals that can be understood and processed by the processors 204. It should be appreciated that the sensors (e.g. sensors 252, 254, 256, 258) may be communicatively coupled to the communications module 209 using any suitable means. For example, as shown in FIG. 3, the sensors 252, 254, 256, 258 may be coupled to the sensor interface 211 via a wired connection. However, in other embodiments, the sensors 252, 254, 256, 258 may be coupled to the sensor interface 211 via a wireless connection, such as by using any suitable wireless communications protocol known in the art. As such, the processor 204 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 204 is also configured to compute advanced control algorithms and communicate to a variety of Ethernet or serial-based protocols (Modbus, OPC, CAN, etc.). Additionally, the memory device(s) 207 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 207 may generally be configured to store suitable computer-readable instructions that, when implemented by the processor(s) 204, configure the controller 202 to perform the various functions as described herein.

Referring back to FIG. 2, the generator stator 120 may be electrically coupled to a stator synchronizing switch 206 via a stator bus 208. In one embodiment, to facilitate the DFIG configuration, the generator rotor 122 is electrically coupled to a bi-directional power conversion assembly 210 or power converter via a rotor bus 212. Alternatively, the generator rotor 122 may be electrically coupled to the rotor bus 212 via any other device that facilitates operation of electrical and control system 200 as described herein. In a further embodiment, the stator synchronizing switch 206 may be electrically coupled to a main transformer circuit breaker 214 via a system bus 216.

The power conversion assembly 210 may include a rotor filter 218 that is electrically coupled to the generator rotor 122 via the rotor bus 212. A rotor filter bus 219 electrically couples the rotor filter 218 to a rotor-side power converter 220. Further, the rotor-side power converter 220 may be electrically coupled to a line-side power converter 222 via a single direct current (DC) link 244. Alternatively, the rotor-side power converter 220 and the line-side power converter 222 may be electrically coupled via individual and separate DC links. In addition, as shown, the DC link 244 may include a positive rail 246, a negative rail 248, and at least one capacitor 250 coupled therebetween.

Figure 4:
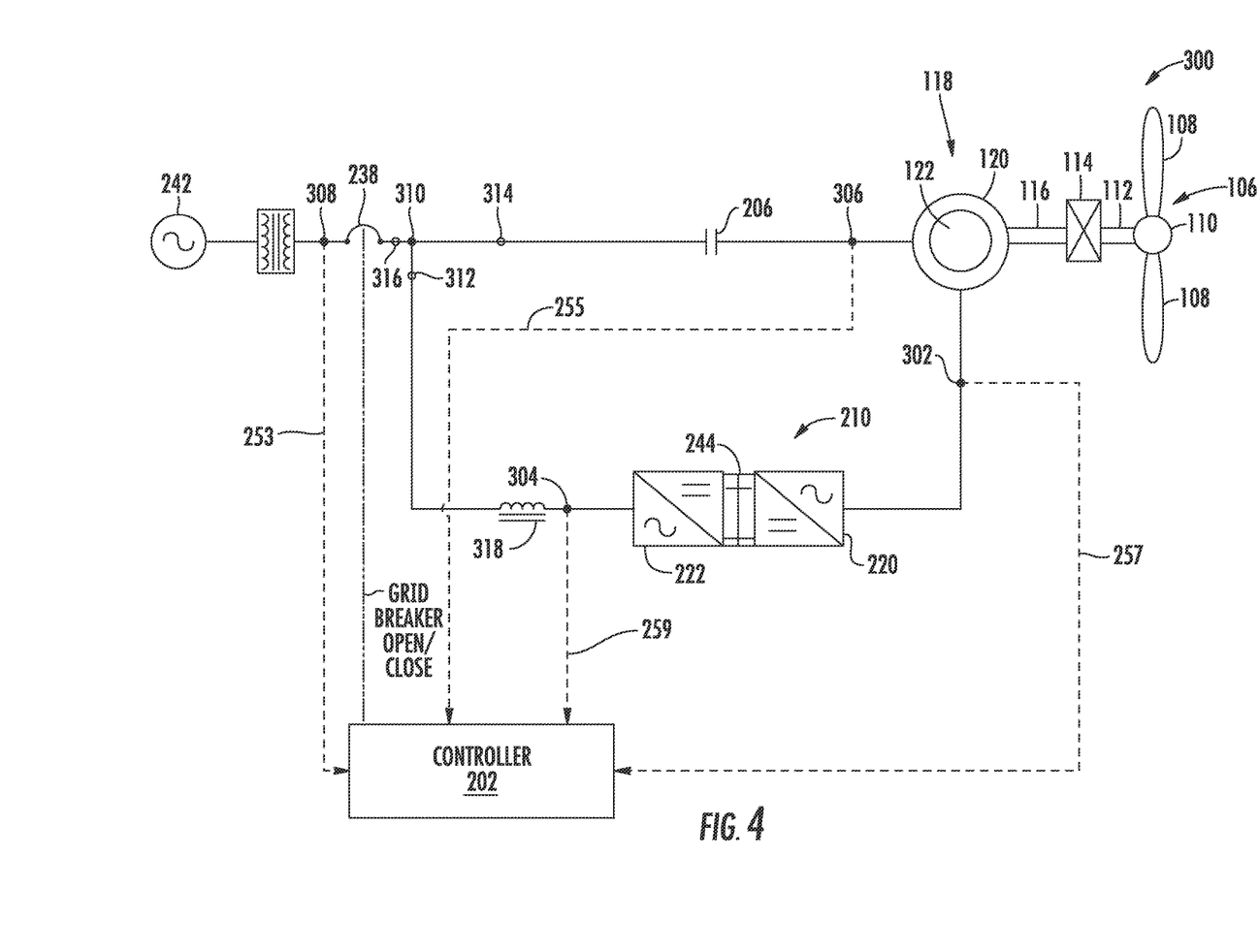
FIG. 4 illustrates a schematic diagram of one embodiment of a system for operating a wind turbine according to the present disclosure.

In addition, a line-side power converter bus 223 may electrically couple the line-side power converter 222 to a line filter 224. Also, a line bus 225 may electrically couple the line filter 224 to a line contactor 226. In addition, the line filter 224 may include a line reactor 318 (as shown in FIG. 4). Moreover, the line contactor 226 may be electrically coupled to a conversion circuit breaker 228 via a conversion circuit breaker bus 230. In addition, the conversion circuit breaker 228 may be electrically coupled to the main transformer circuit breaker 214 via system bus 216 and a connection bus 232. The main transformer circuit breaker 214 may be electrically coupled to an electric power main transformer 234 via a generator-side bus 236. The main transformer 234 may be electrically coupled to a grid circuit breaker 238 via a breaker-side bus 240. The grid circuit breaker 238 may be connected to the electric power transmission and distribution grid via a grid bus 242.

In operation, alternating current (AC) power generated at the generator stator 120 by rotation of the rotor 106 is provided via a dual path to the grid bus 242. The dual paths are defined by the stator bus 208 and the rotor bus 212. On the rotor bus side 212, sinusoidal multi-phase (e.g. three-phase) AC power is provided to the power conversion assembly 210. The rotor-side power converter 220 converts the AC power provided from the rotor bus 212 into DC power and provides the DC power to the DC link 244. Switching elements (e.g. IGBTs) used in bridge circuits of the rotor side power converter 220 can be modulated to convert the AC power provided from the rotor bus 212 into DC power suitable for the DC link 244.

The line side converter 222 converts the DC power on the DC link 244 into AC output power suitable for the electrical grid bus 242. In particular, switching elements (e.g. IGBTs) used in bridge circuits of the line side power converter 222 can be modulated to convert the DC power on the DC link 244 into AC power on the line side bus 225. The AC power from the power conversion assembly 210 can be combined with the power from the stator 120 to provide multi-phase power (e.g. three-phase power) having a frequency maintained substantially at the frequency of the electrical grid bus 242 (e.g. 50 Hz/60 Hz). It should be understood that the rotor-side power converter 220 and the line-side power converter 222 may have any configuration using any switching devices that facilitate operation of electrical and control system 200 as described herein.

Further, the power conversion assembly 210 may be coupled in electronic data communication with the turbine controller 202 and/or a separate or integral converter controller 262 to control the operation of the rotor-side power converter 220 and the line-side power converter 222. For example, during operation, the controller 202 may be configured to receive one or more voltage and/or electric current measurement signals from the first set of voltage and electric current sensors 252. Thus, the controller 202 may be configured to monitor and control at least some of the operational variables associated with the wind turbine 100 via the sensors 252. In the illustrated embodiment, each of the sensors 252 may be electrically coupled to each one of the three phases of the power grid bus 242. Alternatively, the sensors 252 may be electrically coupled to any portion of electrical and control system 200 that facilitates operation of electrical and control system 200 as described herein. In addition to the sensors described above, the sensors may also include a second set of voltage and electric current sensors 254, a third set of voltage and electric current sensors 256, a fourth set of voltage and electric current sensors 258 (all shown in FIG. 2), and/or any other suitable sensors.

It should also be understood that any number or type of voltage and/or electric current sensors may be employed within the wind turbine 100 and at any location. For example, the sensors may be current transformers, shunt sensors, rogowski coils, hall effect current sensors, Micro Inertial Measurement Units (MIMUs), or similar, and/or any other suitable voltage or electric current sensors now known or later developed in the art.

In addition, the converter controller 262 is configured to receive one or more voltage and/or electric current feedback signals. For example, as shown in the illustrated embodiment, the converter controller 262 receives voltage and electric current measurement signals from the second set of voltage and electric current sensors 254 coupled in electronic data communication with stator bus 208. The converter controller 262 may also receive the third and fourth set of voltage and electric current measurement signals from the third and fourth set of voltage and electric current sensors 256, 258. In addition, the converter controller 262 may be configured with any of the features described herein in regards to the main controller 202. Further, the converter controller 262 may be separate from or integral with the main controller 202.

Referring now to FIG. 4, a schematic diagram of one embodiment of a system 300 for operating a wind turbine (e.g. the wind turbine 100 of FIG. 2) connected to a power grid is illustrated. More specifically, the system 300 includes one or more electric current sensors configured to monitor the electric current at various locations of the wind turbine 100. For example, as shown, the system 300 may utilize one or more of the voltage and electric current sensors 252, 254, 256, 258 of the wind turbine as described herein. Thus, as shown, the sensors 252, 254, 256, 258 are configured to generate one or more current feedback signals at a plurality of locations in the wind turbine 100. More specifically, as shown, the current feedback signals may include any suitable signals, including but not limited to line current feedback signals 253, stator current feedback signals 255, rotor-side converter feedback signals 257, line-side converter feedback signals 259, or similar. Thus, the system 300 is configured to monitor for ground faults at multiple locations within the wind turbine 100.

Further, the system 300 includes a controller (e.g. controller 202) communicatively coupled to the one or more sensors 252, 254, 256, 258. Thus, it should be understood that the system controller may be integral with the turbine controller 202 and/or the converter controller 262. Alternatively, the system controller may be separate from the turbine controller 202 and/or the converter controller 262. As such, the system controller is configured to implement the various method steps as described herein and may be configured similar to the turbine controller 202 and/or the converter controller 262. For purposes of illustration, the system controller is synonymous with the turbine controller 202. As such, the controller 202 is configured to receive the current feedback signals 253, 255, 257, 259 from the one or more sensors 252, 254, 256, 258 so as to further process the signals to detect a ground fault of the wind turbine 100.

Thus, the controller 202 is configured to determine whether a ground fault is occurring (or likely to occur) at one or more locations in the wind turbine 100 based on the current feedback signals 253, 255, 257, 259. For example, in certain embodiments, the controller 202 is configured to sum the current feedback signals of the three phases at one or more circuit locations of the wind turbine 100 and compare the sum of the current feedback signals with a predetermined threshold. Further, as shown in FIG. 4, the circuit location may include a rotor-side current location 302, a line-side current location 304, a stator current location 306, a grid current location 308, or similar. More specifically, for each of these locations 302, 304, 306, 308, the sum of the three phases should be equal to zero during normal operation (i.e. no ground faults are present). Thus, if the sum is not equal to zero or if the sum is above a predetermined threshold, then a ground fault is likely occurring (or likely to occur) in the wind turbine 100. In addition, in certain embodiments, the controller 202 is configured to determine if any part of the current sensing circuit is saturated, as detection of ground faults at any location during saturation may not be valid.

In additional embodiments, the controller 202 may also filter the current feedback signals for the three phases. As such, the controller 202 may include one or more filters configured to process or filter the current feedback signals 253, 255, 257, 259 for the three phases. For example, in certain embodiments, the filters may include at least one of or a combination of the following: a low pass filter, a high pass filter, a notch filter, or similar, or any combinations thereof.

The predetermined threshold as described herein may include a percentage of a range of one or more of the electric current sensors 252, 254, 256, 258. For example, in certain embodiments, the percentage may be from about 5% to about 25%, more preferably from about 5% to about 10%, more particularly about 8%. In additional embodiments, the predetermined threshold may be less than 1% or greater than 25%. Further, the controller 202 may also determine whether the sum of the phase currents is within a predetermined range.

In further embodiments, the controller 202 may also be configured to demodulate the current feedback signals 253, 255, 257, 259 for the three phases. For example, after summing and filtering the three-phase currents, the controller 202 may demodulate the currents into multiple components, e.g. x-y components or a d-q transformation. Thus, in such embodiments, the predetermined threshold may be reduced. More specifically, in such embodiments, the percentage of the range of one or more of the electric current sensors may be from about 1% to about 20%, more preferably from about 2% to about 7%.

The controller 202 may also be configured to determine the presence of a ground fault by summing the current feedback signals of node inputs and outputs at a node circuit location of the wind turbine 100. For example, as shown in FIG. 4 at node circuit 310, the controller 202 is configured to sum the node inputs 312, 314 and compare the sum to the sum of node output(s) 316 to determine a difference between the sum of the inputs 312, 314 and the sum of node output(s) 316. Since the sum of the inputs 312, 314 should be equal to the sum of node output(s) 316, a difference above a predetermined threshold may be indicative of a ground fault.

If one or more ground faults are detected using any suitable method, the controller 202 is configured to open one or more electrical or switches of the wind turbine 100, e.g. any of the switches of FIG. 2 or 4 or similar. More specifically, in certain embodiments, the electrical contactors or switches may include other breakers in the wind turbine 100 as well as a synchronizing switch (e.g. switch 206), a line converter switch (e.g. an optional switch between node 310 and line reactor 318 of the turbine 100), a distortion filter switch (e.g. an optional switch between nodes 310 and 312), or similar. Further, it should be understood that such switches may be any type of device that can be used to isolate any part of the electrical system of the turbine 100.

In addition, the controller 202 is configured to open the grid breaker 238 that electrically couples the wind turbine 100 to the power grid 242 so as to prevent damage to the turbine 100 caused by the ground fault(s). As such, by opening one or more electrical components of the wind turbine 100 and the grid breaker 238, external energy is no longer capable of feeding the ground fault. More specifically, in certain embodiments, the controller 202 may shut down the wind turbine 100. For example, in particular embodiments, the controller 202 may open one or more electrical contactors (e.g. synchronizing contactor 206) of the wind turbine 100 in response to a ground fault. It should be understood that tripping the wind turbine 100 may further include any suitable action now known or later developed in the art that de-energizes the wind turbine 100. In addition, the controller 202 may be configured to implement a follow-up action after tripping one or more electrical components of the wind turbine 100 and opening the grid breaker 238. For example in certain embodiments, the follow-up action may include re-starting the wind turbine 100 after a predetermined time period that is sufficient to allow the ground fault to clear, if possible (i.e. if the fault can actually be cleared). More specifically, in certain embodiments, the controller 202 may wait to re-start the wind turbine 100 until the current feedback signals 253, 255, 257, 259 return to values that are either within the predetermined range and/or below the predetermined threshold. As such, the controller 202 continuously monitors the electric current of the wind turbine 100 at a plurality of locations to detect ground faults and operate the wind turbine 100 accordingly.

Alternatively, in certain embodiments, the ground fault may not be easily cleared and may require further repair and/or replacement before the turbine 100 can operate safely. For example, in particular instances, the ground fault may be caused by a hardware failure. As such, the fault cannot be cleared until the hardware failure is repaired and/or replaced. Thus, if the fault cannot be easily cleared, the controller 202 may be configured to send an alarm signal to a user to indicate that the ground fault cannot be cleared without further action (i.e. by replacing the faulty hardware, etc.). In such instances, the controller 202 refrains from continuously trying to re-start the turbine 100 in the event that such action will cause further damage to the turbine 100.

Figure 5:
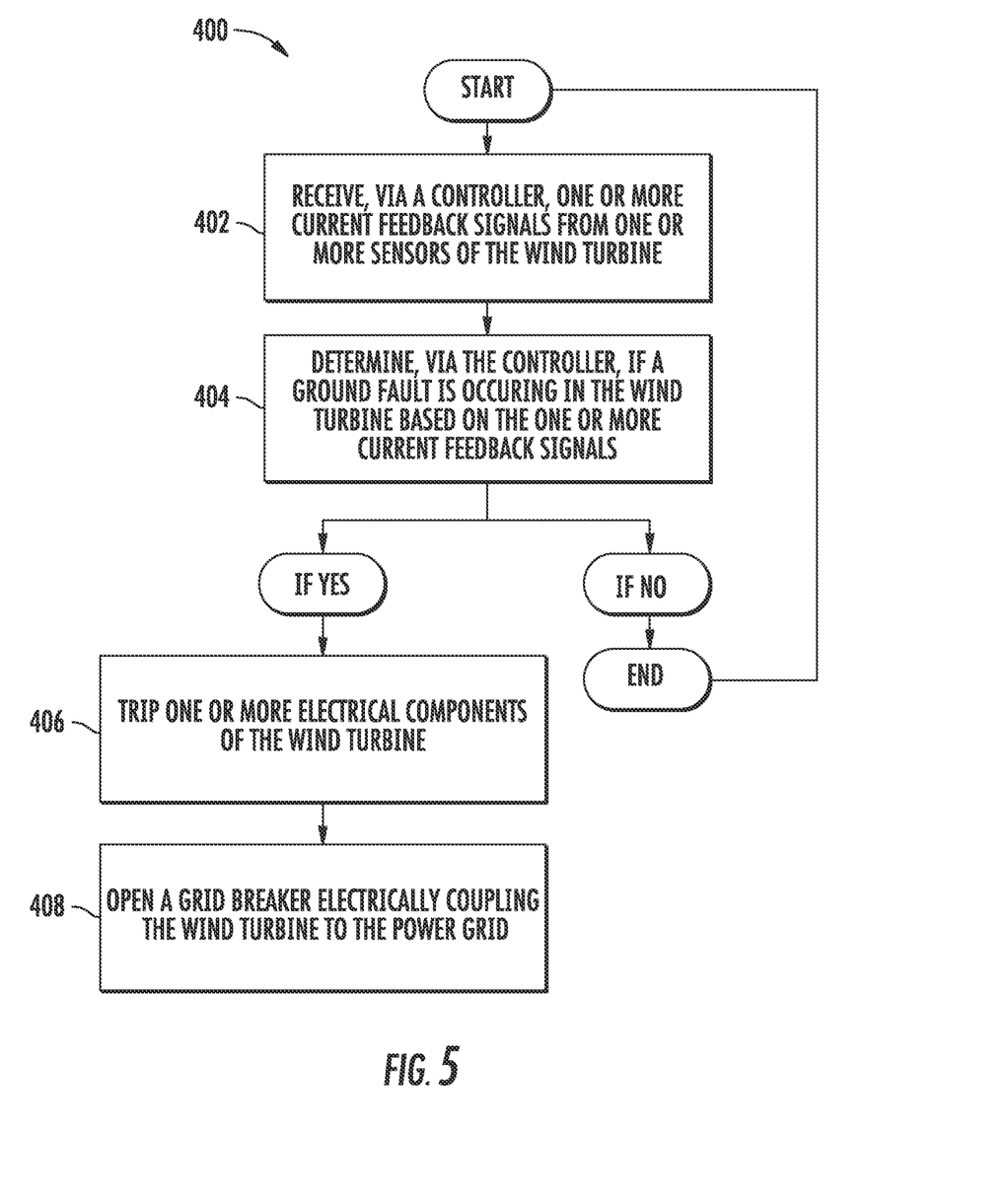
FIG. 5 illustrates a flow diagram of one embodiment of a method for operating a wind turbine connected to a power grid according to the present disclosure.

Referring now to FIG. 5, a flow diagram of one embodiment of a method 400 for operating a wind turbine 100 connected to a power grid is illustrated. As shown at 402, the method 400 includes receiving, via a controller, one or more current feedback signals from one or more sensors of the wind turbine 100. As shown at 404, the method 400 includes determining, via the controller, if a ground fault is occurring in the wind turbine 100 based on the current feedback signals. In response to detecting a ground fault, as shown at 406, the method 400 includes tripping one or more electrical components of the wind turbine 100. For example, in certain embodiments, the method 400 may include opening one or more electrical contactors (e.g. synchronizing contactor 206) of the wind turbine 100 in response to a ground fault. In addition, as shown at 408, the method 400 includes opening the grid breaker 238 electrically coupling the wind turbine 100 to the power grid 242. In certain embodiments, the method 400 may include opening the synchronizing contactor 206 and the grid breaker 238 simultaneously. In alternative embodiments, the method 400 may include first opening the synchronizing contactor 206 and subsequently opening the grid breaker 238 or vice versa. Accordingly, by opening internal contactor(s) and disconnecting the wind turbine 100 from the grid 242, the present disclosure prevents all potential energy sources from supplying current to the location of the ground fault, thereby effectively isolating the fault.

Figure 6:
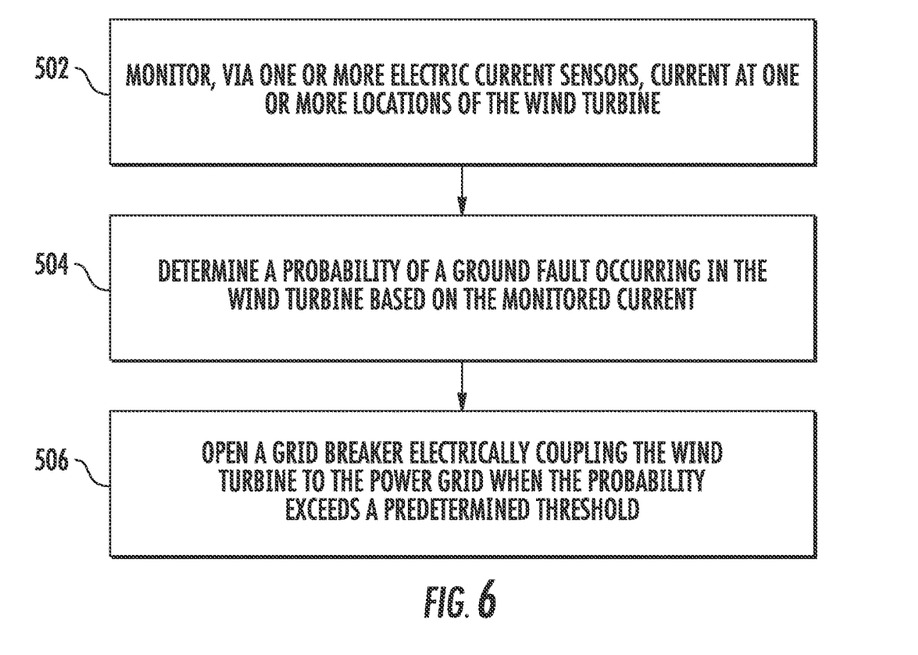
FIG. 6 illustrates a flow diagram of another embodiment of a method for operating a wind turbine connected to a power grid according to the present disclosure.

Referring now to FIG. 6, a flow diagram of one embodiment of a method 500 for operating a wind turbine 100 connected to a power grid is illustrated. As shown at 502, the method 500 includes monitoring, via one or more sensors, electric current at one or more locations of the wind turbine. As shown at 504, the method 500 includes determining, via the controller, a probability of a ground fault occurring in the wind turbine based on the monitored electric current. As shown at 506, the method 500 includes opening a grid breaker electrically coupling the wind turbine to the power grid when the probability exceeds a predetermined threshold. For example, in certain embodiments, the probability may be reflective of an instantaneous over-current condition occurring in the wind turbine, thereby indicating the beginning of a ground fault or any other type of fault condition for which the continued application of external or internal energy sources may be harmful. In further embodiments, the probability may be reflective of an actual ground fault presently occurring in wind turbine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a wind turbine connected to a power grid, the method comprising:
    measuring, via one or more electric current sensors, one or more current feedback signals at a plurality of locations in the wind turbine;
    receiving, via a controller, the one or more current feedback signals from the one or more electric current sensors of the wind turbine;
    determining, via the controller, whether a ground fault is occurring in the wind turbine at each of the locations based on the current feedback signals;
    in response to detecting a ground fault, tripping one or more electrical components of the wind turbine; and,
    electrically de-coupling the wind turbine from the power grid.

2. The method of claim 1, wherein electrically de-coupling the wind turbine from the power grid further comprises opening a grid breaker electrically coupling the wind turbine to the power grid.

3. The method of claim 1, wherein determining whether a ground fault is occurring in the wind turbine at each of the locations based on the current feedback signals further comprises:
    summing the current feedback signals at a first location of the wind turbine;
    filtering the current feedback signals for the first location; and,
    comparing the sum of the current feedback signals with a predetermined threshold, wherein a sum above the predetermined threshold is indicative of a ground fault.

4. The method of claim 3, wherein the predetermined threshold comprises a percentage of a range of one or more of the electric current sensors, wherein the percentage is from about 5% to about 10%.

5. The method of claim 3, further comprising demodulating the current feedback signals for the first location, wherein the predetermined threshold comprises a percentage of a range of one or more of the electric current sensors, wherein the percentage is from about 2% to about 7%.

6. The method of claim 1, wherein determining whether a ground fault is occurring in the wind turbine at each of the locations based on the current feedback signals further comprises:
    at a node circuit location of the wind turbine, summing the current feedback signals of node inputs;
    summing the current feedback signals of node outputs; and,
    determining a difference between the sum of the node inputs and the sum of the node outputs, wherein a difference above a predetermined threshold is indicative of a ground fault.

7. The method of claim 1, wherein the current feedback signals comprise at least one of line current feedback signals, line-side converter feedback signals, rotor-side converter feedback signals, or stator current feedback signals.

8. The method of claim 1, wherein tripping one or more electrical components of the wind turbine further comprises at least one of shutting down the wind turbine or opening one or more electrical contactors or switches of the wind turbine.

9. The method of claim 1, further comprising implementing a follow-up action after tripping one or more electrical components and opening the grid breaker, wherein the follow-up action comprises re-starting the wind turbine after a predetermined time period that is sufficient to allow the ground fault to clear.

10. The method of claim 1, wherein if the ground fault cannot be cleared, the follow-up action comprises sending an alarm signal to a user to indicate that the ground fault cannot be cleared without further action.

11. A method for operating a wind turbine connected to a power grid, the method comprising:
    monitoring, via one or more sensors, current at one or more locations of the wind turbine;
    determining, via the controller, a probability of a ground fault occurring in the wind turbine based on the monitored current; and,
    opening a grid breaker electrically coupling the wind turbine to the power grid when the probability exceeds a predetermined threshold.

12. A system for operating a wind turbine connected to a power grid, the system comprising:
    one or more electric current sensors configured to generate one or more current feedback signals of the wind turbine;
    a grid breaker electrically coupling the wind turbine to the power grid; and,
    a controller communicatively coupled to the one or more electric current sensors, the controller configured to perform one or more operations, the operations comprising:
        receiving the one or more current feedback signals from the one or more sensors, determining if a ground fault is occurring in the wind turbine based on the current feedback signals,
in response to detecting a ground fault, tripping one or more electrical components of the wind turbine, and
opening the grid breaker between the wind turbine and the power grid.

13. The system of claim 12, wherein determining if a ground fault is occurring in the wind turbine based on the current feedback signals further comprises:
at a three-phase location of the wind turbine, summing the current feedback signals of the three phases;
filtering the current feedback signals for the three phases; and,
comparing the sum of the current feedback signals with a predetermined threshold, wherein a sum above the predetermined threshold is indicative of a ground fault, wherein the predetermined threshold comprises a percentage of a range of one or more of the electric current sensors, wherein the percentage is from about 5% to about 10%.

14. The system of claim 13, further comprising demodulating the current feedback signals for the three phases, wherein the percentage is from about 2% to about 7%.

15. The system of claim 12, wherein determining if a ground fault is occurring in the wind turbine based on the current feedback signals further comprises:
at a node circuit location of the wind turbine, summing the current feedback signals of node inputs;
summing the current feedback signals of node outputs; and,
determining a difference between the sum of node inputs and the sum of node outputs, wherein a difference above a predetermined threshold is indicative of a ground fault.

16. The system of claim 12, further comprising:
measuring, via the one or more electric current sensors, one or more current feedback signals at a plurality of locations in the wind turbine; and,
determining, via the controller, whether a ground fault is occurring in the wind turbine at each of the locations.

17. The system of claim 12, wherein the current feedback signals comprise at least one of line current feedback signals, line-side converter feedback signals, rotor-side converter feedback signals, or stator current feedback signals.

18. The system of claim 12, wherein tripping one or more electrical components of the wind turbine further comprises at least one of shutting down the wind turbine or opening one or more electrical contactors or switches of the wind turbine.

19. The system of claim 12, further comprising implementing a follow-up action after tripping one or more electrical components and opening the grid breaker, wherein the follow-up action comprises at least one of:
re-starting the wind turbine after a predetermined time period that is sufficient to allow the ground fault to clear if possible, or
sending an alarm signal to a user to indicate that the ground fault cannot be cleared without further action.

* * * * *